United States Patent
Shindou (10) Patent No.: US 7,243,625 B2
(45) Date of Patent: Jul. 17, 2007

(54) VARIABLE VALVE CONTROL SYSTEM AND METHOD FOR INTERNAL COMBUSTION ENGINE

(75) Inventor: Shigeki Shindou, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 142 days.

(21) Appl. No.: 11/084,255

(22) Filed: Mar. 21, 2005

(65) Prior Publication Data

US 2005/0217620 A1    Oct. 6, 2005

(30) Foreign Application Priority Data

Mar. 30, 2004   (JP) .............................. 2004-098324

(51) Int. Cl.
   *F01L 1/34*   (2006.01)
(52) U.S. Cl. ............................... 123/90.16; 123/90.17; 123/90.31; 123/90.15
(58) Field of Classification Search ............. 123/90.16, 123/90.15, 90.17, 90.31
   See application file for complete search history.

(56) References Cited

U.S. PATENT DOCUMENTS 6,397,800 B2 *   6/2002   Nohara et al. ........... 123/90.15
6,779,508 B2 *   8/2004   Fuwa ........................ 123/396
2004/0231624 A1  11/2004  Shindou et al.

FOREIGN PATENT DOCUMENTS

| JP | 5-98916 A | 4/1993 |
|---|---|---|
| JP | 7-139378 A | 5/1995 |
| JP | 2000-130196 A | 5/2000 |
| JP | 2003-49671 A | 2/2003 |

OTHER PUBLICATIONS

U.S. Appl. No. 10/953,365, filed Sep. 30, 2004, Shindou.

* cited by examiner

*Primary Examiner*—Thomas Denion
*Assistant Examiner*—Zelalem Eshete
(74) *Attorney, Agent, or Firm*—Foley & Lardner LLP

(57) ABSTRACT

There is provided a variable valve control system for an internal combustion engine, including an intake valve event and lift control mechanism capable of varying an operation angle of an intake valve of the engine; an intake valve timing control mechanism capable of varying a center phase of the operation angle of the intake valve; a detection unit to detect a malfunction in the intake valve timing control mechanism; and a fail-safe unit to control the intake valve event and lift control mechanism upon detection of the malfunction in the intake valve timing control mechanism in such a manner that intake valve opening timing becomes advanced with respect to top dead center.

12 Claims, 7 Drawing Sheets

VARIABLE VALVE CONTROL SYSTEM AND METHOD FOR INTERNAL COMBUSTION ENGINE

BACKGROUND OF THE INVENTION

The present invention relates to a variable valve control system for an internal combustion engine that is equipped with an intake valve timing control mechanism and an intake valve event and lift control mechanism, and more specifically to a fail-safe technique applicable at the occurrence of a malfunction in the intake valve timing control mechanism. The present invention also relates to a variable valve control method for an internal combustion engine.

There have been proposed various variable valve control systems to vary the intake/exhaust valve lift characteristics of internal combustion engines for improvements in engine output and fuel consumption and exhaust gas purification. Japanese Laid-Open Patent Publication No. H07-139378 discloses a variable valve control system for an internal combustion engine, having an intake (or exhaust) valve timing control mechanism forced to reduce a valve overlap between intake and exhaust valve opening periods upon detection of a failure in an actuation unit of the valve timing control mechanism, so as to maintain a certain level of driving performance. Japanese Laid-Open Patent Publication No. 2000-130196 discloses a variable valve control system for an internal combustion engine, having an intake (or exhaust) valve event and lift control mechanism forced to reduce or cancel a valve overlap between intake and exhaust valve opening periods upon detection of an abnormal condition in the engine. Japanese Laid-Open Patent Publication No. 2003-049671 discloses a variable valve control system for an internal combustion engine, having intake and exhaust valve timing control mechanisms controlled on the basis of fail-safe control data, respectively, upon detection of an abnormal condition in either one of the valve timing control mechanisms. For example, this variable valve control system may be configured to control the normally-functioning valve timing control mechanism according to a fail-safe valve control map while forcibly fixing the abnormally-functioning valve timing control mechanism at the most retarded position. Both of the valve timing control mechanisms can alternatively be fixed at the most retarded positions.

SUMMARY OF THE INVENTION

It is desirable to adjust intake valve opening/closing timing of an internal combustion engine, notably a gasoline engine, depending on engine operating conditions, such as engine speed and load, in order to attain improvements in engine output and fuel consumption and exhaust gas purification. Hence, there has been newly proposed a variable valve control system for an internal combustion engine equipped with both of an intake valve event and lift control mechanism and an intake valve timing control mechanism. This newly-proposed valve control system does not however have a fail-safe technique applied thereto at the occurrence of a malfunction such as an abnormal condition or a failure (e.g. adhesion) in the valve timing control mechanism. If the newly-proposed valve timing control system employs the same fail-safe technique as employed in the above-disclosed valve control systems so as to reduce or cancel an valve overlap forcibly upon detection of a malfunction in the valve timing control mechanism, the spit-back of residual gas into an engine intake port does not occur especially under high-load engine operating conditions so that the engine fails to obtain a fuel atomization effect and thereby deteriorates in combustion stability.

It is therefore an object of the present invention to provide a variable valve control system for an internal combustion engine equipped with both of an intake valve timing control mechanism and an intake valve event and lift control mechanism to adjust intake valve opening/closing timing widely depending on engine operating conditions without causing a deterioration in engine combustion stability even at the occurrence of a malfunction in the valve timing control mechanism.

It is also an object of the present invention to provide a control method for an internal combustion engine equipped with an intake valve timing control mechanism and an intake valve event and lift control mechanism.

According to a first aspect of the invention, there is provided a variable valve control system for an internal combustion engine, comprising: an intake valve event and lift control mechanism capable of varying an operation angle of an intake valve of the engine; an intake valve timing control mechanism capable of varying a center phase of the operation angle of the intake valve; a detection unit to detect a malfunction in the intake valve timing control mechanism; and a fail-safe unit to control the intake valve event and lift control mechanism upon detection of the malfunction in the intake valve timing control mechanism in such a manner that intake valve opening timing becomes advanced with respect to top dead center.

According to a second aspect of the invention, there is provided a variable valve control system for an internal combustion engine, comprising: an intake valve event and lift control mechanism capable of varying an operation angle of an intake valve of the engine; an intake valve timing control mechanism capable of varying a center phase of the operation angle of the intake valve; a detection unit to detect a malfunction in the intake valve timing control mechanism; and a fail-safe unit to control the intake valve event and lift control mechanism upon detection of the malfunction in the intake valve timing control mechanism in such a manner that intake valve opening timing becomes advanced with respect to top dead center when the engine is in a high-load operating state and becomes retarded with respect to top dead center when the engine is in a low/middle-load operating state.

According to a third aspect of the invention, there is provided a variable valve control system for an internal combustion engine, comprising: first intake valve control means for varying an intake valve operation angle of the engine; second intake valve control means for varying a center phase of the intake valve operation angle; malfunction detecting means for detecting a malfunction in said second intake valve control means; and fail-safe means for controlling said first intake valve control means so as to secure a valve overlap before top dead center upon detection of the malfunction in said second intake valve control means.

According to a fourth aspect of the invention, there is provided a variable valve control method for an internal combustion engine, comprising: detecting a malfunction in intake valve timing control of the engine; and performing a fail-safe control operation to secure a valve overlap before top dead center upon detection of the malfunction in intake valve timing control of the engine.

The other objects and features of the invention will also become understood from the following description.

DESCRIPTION OF THE EMBODIMENTS

The present invention will be described in detail by way of the following first, second and third embodiments, in which like parts and portions are designated by like reference numerals to omit repeated explanations thereof.

Figure 1:
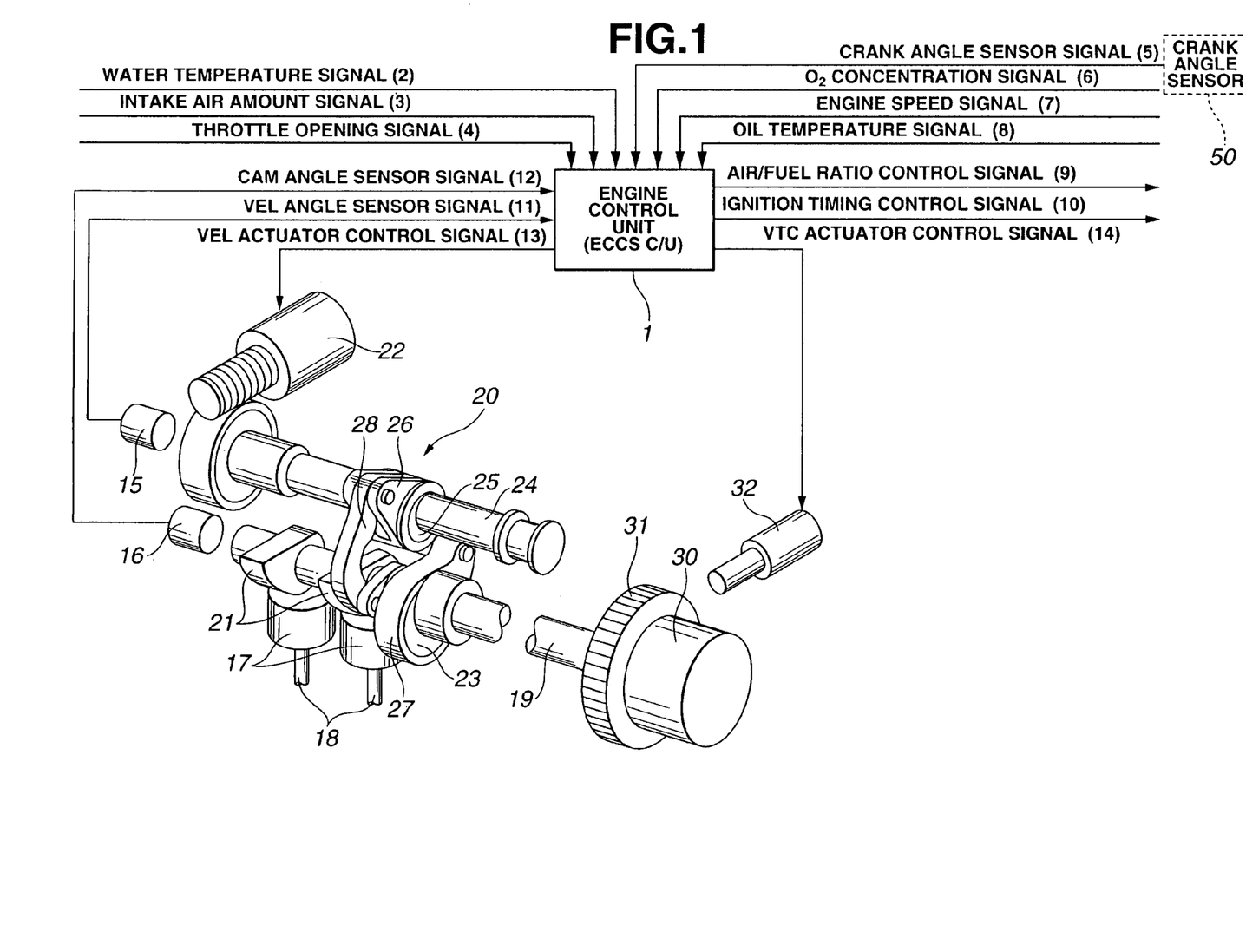
FIG. 1 is a schematic illustration of a variable valve control system for an internal combustion engine equipped with an intake valve timing control mechanism and an intake valve event and lift control mechanism according to first, second and third embodiments of the invention.

Each of the first, second and third embodiments refers to an internal combustion engine in which each cylinder has a pair of intake valves 18 and a pair of exhaust valves (not shown) and in which intake camshaft 19 is arranged to receive rotation from an engine crankshaft through a pulley or sprocket and rotate about its own center axis in timed relation with the crankshaft as shown in FIG. 1. The engine includes engine control unit 1 (ECCS C/U) and a variable valve control system to control the valve lift characteristics of intake valves 18 under the control of engine control unit 1. The variable valve control system has two intake valve control mechanisms: one is valve event and lift control (VEL) mechanism 20 capable of continuously varying the operation angle and lift (quantity) of intake valves 18 and the other is valve timing control (VTC) mechanism 30 capable of advancing and retarding the center phase of the operation angle of intake valves 18, at which the lift of intake valve 19 becomes maximum, with respect to the crank angle and thereby varying the valve timing of intake valves 18. The center phase of the intake valve operation angle may be hereinafter referred to as an "intake valve maximum lift phase θ". With the combined use of VEL mechanism 20 and VTC mechanism 30, it becomes possible to adjust the timing of opening and closing intake valves 18 widely depending on engine operating conditions and thereby obtain improvements in engine output and fuel consumption and exhaust gas purification. No exhaust valve control mechanism is provided so that the valve lift characteristics of the exhaust valves are fixed in each embodiment.

VEL mechanism 20 includes a pair of swing cams 21 fixedly mounted on intake camshaft 19 so as to swing on valve lifters 17 and thereby drive respective intake valves 18, circular drive cam 23 eccentrically and fixedly (integrally) mounted on intake camshaft 19, control shaft 24 extending in parallel with intake camshaft 19 in a cylinder row direction of the engine, circular control cam 25 eccentrically and fixedly (integrally) mounted on control shaft 24, rocker arm 26 pivotally mounted on control cam 25, ring-shaped pivotal link 27 having one end pivotally fitted over drive cam 23, rod-shaped pivotal link 28 connecting the other end of rocker arm 26 and one end of swing cam 21 and VEL actuation device 22 electrically driven to change a rotational angle (angular position) of control shaft 24.

Upon the rotation of intake camshaft 19 in timed relation to the crankshaft, drive cam 23 causes pivotal link 27 to make an approximately translational movement while allowing one end of pivotal link 27 to rotate about the axis of intake camshaft 18. Then, rocker arm 26 pivots about the axis of control cam 25 due to such a movement of pivotal link 27 so that pivotal link 28 causes swing cams 21 to swing within a given swing angle range and thereby move valve lifters 17 up and down to open and close intake valves 18. When the rotational angle of control shaft 24 is changed with the operation of VEL actuation device 22, the center of control cam 25 (about which rocker arm 26 swings) becomes rotationally displaced relative to the axis of control shaft 24 so as to shift the initial position (center phase of swing range) of swing cams 21. In this way, VEL mechanism 20 continuously varies the operation angle and lift of intake valves 18 with the maximum lift phase of intake valves 18 being held substantially constant.

In VEL mechanism 20, rocker arm 26 and links 27 and 28 are arranged closely and collectively around intake camshaft 19. VEL mechanism 20 is thus compact in size for ease of installation into the engine. Further, many parts of VEL mechanism 20 are in surface contact with one another. For example, drive cam 23 and pivotal link 27 have bearing portions in sliding contact with each other. Control cam 25 and rocker arm 26 also have bearing portions in sliding contact with each other. Accordingly, VEL mechanism 20 is advantageous in lubrication, durability and reliability without the need to provide biasing means e.g. a return spring in VEL mechanism 20. As VEL mechanism 20 takes a direct drive-type valve operation layout, it is possible to improve the rotation limit with a simple and compact mechanism construction.

VTC mechanism 30 can employ a known construction. One construction example of VTC mechanism 30 is disclosed in Japanese Laid-Open Patent Publication No. H05-098916. Among various VTC mechanisms, the helical spline type and the vane type are well known. VTC mechanism 30 includes outer rotor 31 having a cam pulley or sprocket rotatable in timed relation with the crankshaft, an inner rotor (not shown) disposed in outer rotor 31 so that the inner rotor rotates together with intake camshaft 19 and VTC actuation device 32 hydraulically driven by an oil pump to rotate the inner rotor and outer rotor 31 relative to each other.

When the inner rotor and outer rotor 31 are relatively rotated with the operation of VTC actuation device 32, VTC mechanism 30 advances or retards the maximum lift phase of intake valves 18 and thereby varies the operation timing of intake valves 18 continuously.

Engine control unit 1 (as a fail-safe unit) is composed of a known digital computer including CPU, ROM, RAM and input/output interface and is programmed to execute various control processes (explained later). To engine control unit 1 are inputted various detection signals corresponding to engine operating conditions. The input signals include water temperature signal 2 from a water temperature sensor, intake air amount signal 3 from an air flow meter, throttle opening signal 4 from a throttle sensor, crank angle signal 5 from crank angle sensor 50 that detects the rotational angle (angular position) of the engine crankshaft, $O_2$ concentration signal 6 from an oxygen sensor disposed in an exhaust passage of the engine, engine speed signal 7 from an engine speed sensor, oil temperature signal 8 from an oil temperature sensor, VEL angle sensor signal 11 from VEL angle sensor 15 that detects the rotational angle of control shaft 24, and cam angle sensor signal 12 from cam angle sensor 16 that detects the rotational angle (angular position) of intake camshaft 19. Based on these detection signals 2-8, 11 and 12, engine control unit 1 generates control signals such as air/fuel ratio control signal 9, ignition timing control signal 10, VEL actuator control signal 13 and VTC actuator control signal 14 to the actuators of a fuel injection device, an ignition device, VEL actuation device 22 and VTC actuation device 32, respectively, so as to control the operations of these devices.

Figure 3A:
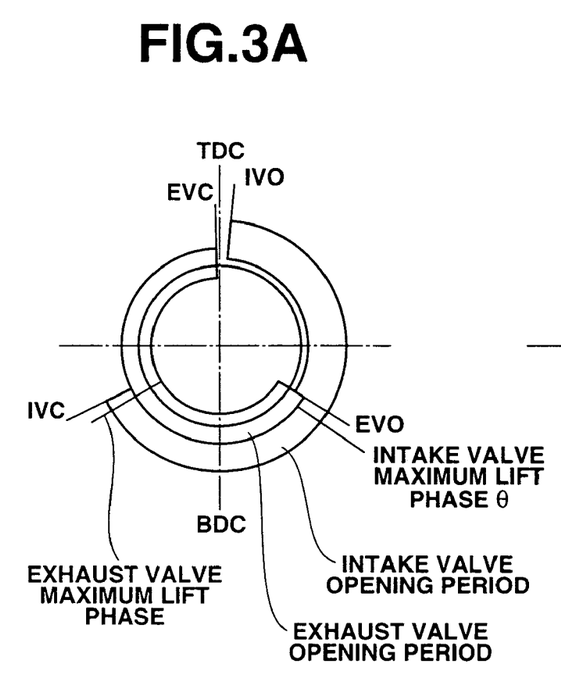
FIGS. 3A and 3B are valve timing diagrams illustrating valve opening periods (or durations) and valve opening/closing timing of intake and exhaust valve of the engine.
Figure 3B:
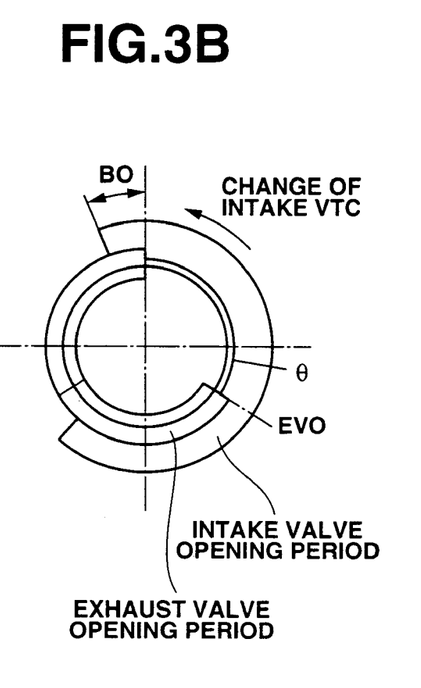

Herein, the valve lift characteristics of the exhaust valves are fixed such that the exhaust valve opening timing EVO comes before intake bottom dead center BDC and the exhaust valve closing timing EVC comes near (or coincides with) exhaust top dead center TDC as shown in FIGS. 3A and 3B. On the other hand, the intake valve opening timing IVO and the intake valve closing timing IVC are changed according to the engine operating conditions. Under high-speed high-load engine operating conditions, for example, the intake valve opening timing IVO and the intake valve closing timing IVC are adjusted to secure a valve overlap BO between intake and exhaust valve opening periods before top dead center TDC, as shown in FIG. 3B, in order to improve intake charging efficiency. The maximum lift phase $\theta$ of intake valves 18 may be advanced with respect to the standard setting (shown in FIG. 3A) to secure a valve overlap BO before TDC. Alternatively, the intake valve operation angle may be increased to secure the valve overlap BO.

In each of the first to third embodiments, engine control unit controls the valve lift characteristics of intake valves 18 by the execution of a valve control program.

Figure 7:
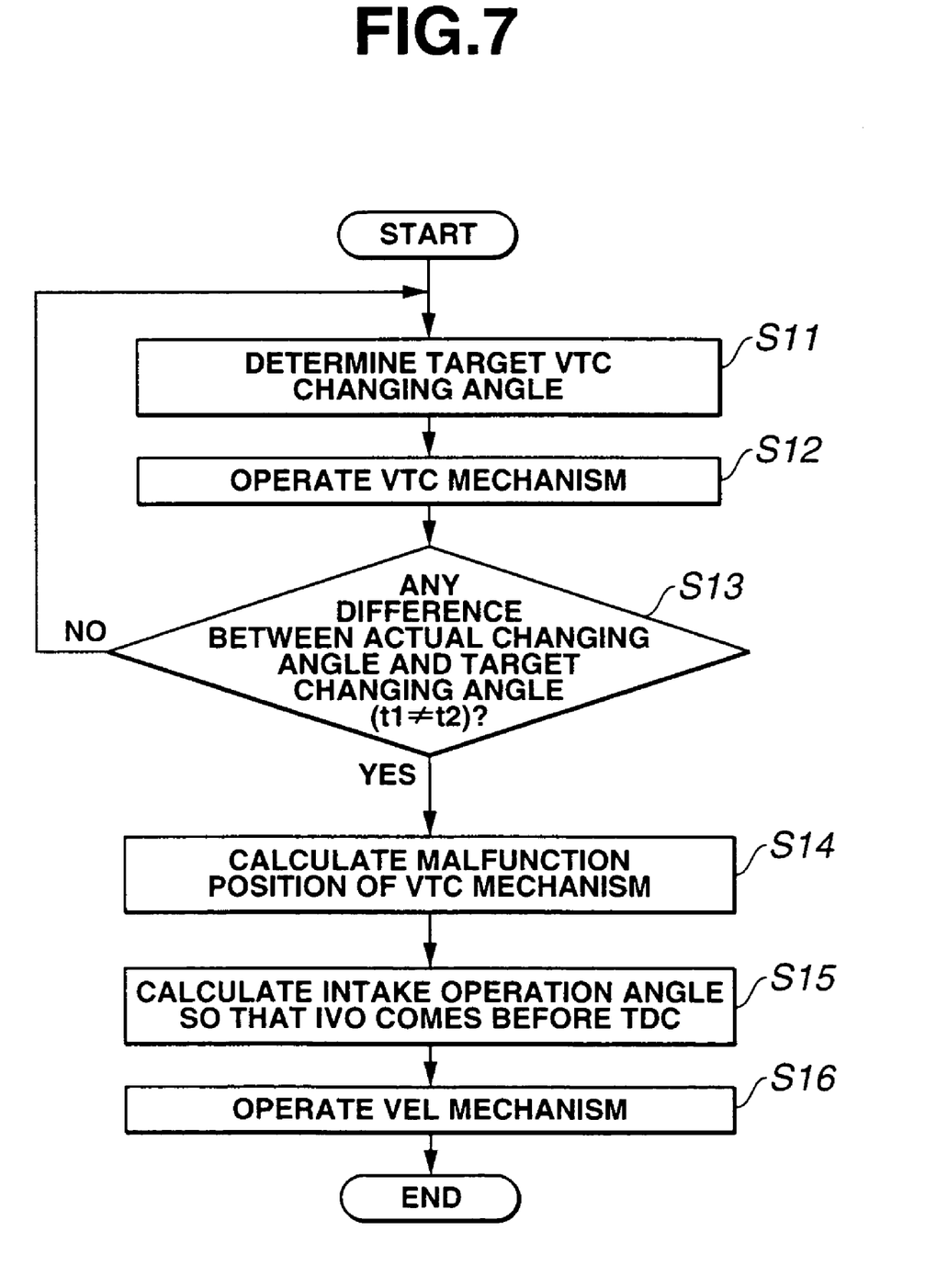
FIG. 7 is a flowchart for a valve control program run on the variable valve control system according to the first embodiment of the invention.

The valve control program of the first embodiment includes the following steps as shown in FIG. 7.

Figure 2:
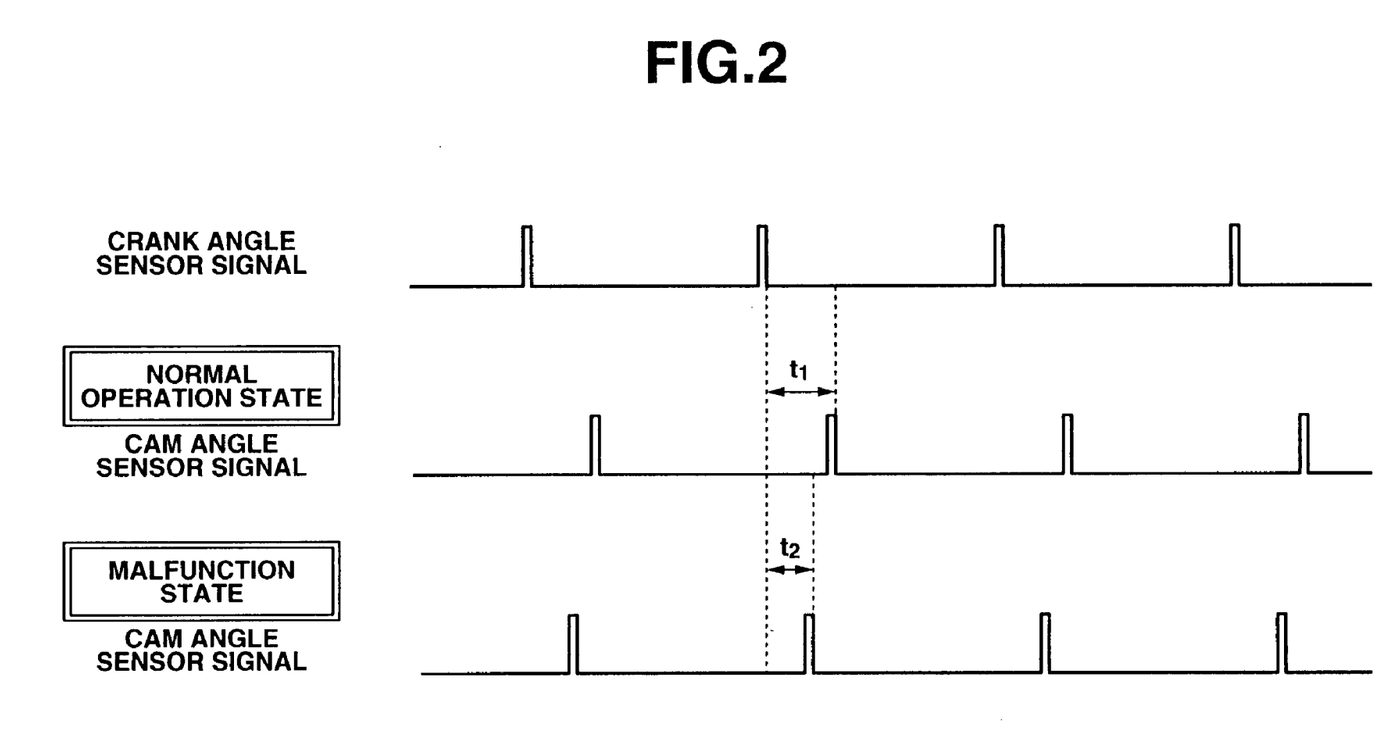
FIG. 2 is a time chart for detection of a malfunction of the intake valve timing control mechanism.

At step S11, engine control unit 1 determines a target VTC changing angle, which is a target value of the maximum lift phase of intake valves 18 to be attained by VTC mechanism 30, based on the engine operating conditions. This target VTC changing angle corresponds to a target value t1 (shown in FIG. 2) of the phase difference of the intake camshaft 19 with respect to the crank angle.

At step S12, engine control unit 1 outputs VTC actuator control signal 14 responsive to the target VTC changing angle and thereby drives VTC mechanism 30 to the target VTC changing angle.

At step S13, engine control unit 1 detects the occurrence of a malfunction including an abnormal condition or failure in VTC mechanism 30 where VTC mechanism 30 cannot function properly for some reasons such as the adhesion of hydraulic VTC actuation device 32. In the first embodiment, engine control unit 1 calculates an actual VTC changing angle of VTC mechanism 30 based on crank angle sensor signal 5 and camshaft angle sensor signal 12 and decides on the occurrence of a malfunction in VTC mechanism 30 by comparison of the actual TVC changing angle and the target TVC changing angle. The actual VTC changing angle corresponds to a difference t2 (shown in FIG. 2) between crank angle sensor signal 5 and camshaft angle sensor signal 12, i.e. a phase difference between the crankshaft and camshaft 19. When t1 and t2 are not equal to each other so that the difference between t1 and t2 becomes greater than a predetermined value, it is judged that there occurs a malfunction in VTC mechanism 30. Namely, engine control unit 1 also serves as a malfunction detection unit in combination with cam angle sensor 16 and crank angle sensor 50 in the first embodiment. Engine control unit 1 may be further programmed to warn the vehicle driver of the malfunction of VTC mechanism 30 by means of a warning device (such as a warning lamp).

Upon detection of the malfunction in VTC mechanism at step S13, engine control unit 1 performs a fail-safe valve control operation through steps S14 to S16.

At step S14, engine control unit 1 calculates a malfunction position of VTC mechanism 30 based on crank angle sensor signal 5 and cam angle sensor signal 12. The malfunction position of VTC mechanism 30 corresponds to the maximum lift phase $\theta$ of intake valves 18.

Figure 4:
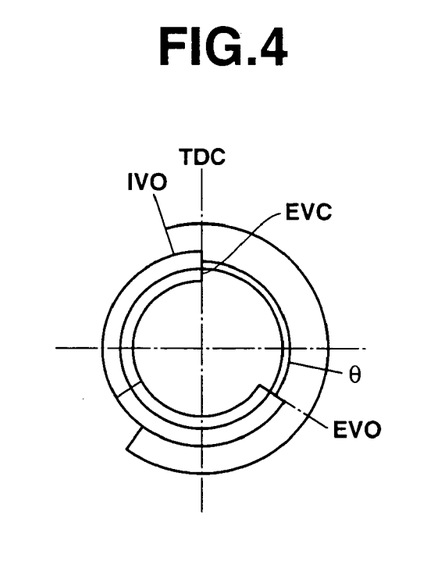
FIG. 4 is a valve timing diagram illustrating intake and exhaust valve opening periods and valve opening/closing timing according to the first embodiment of the invention.

At step S15, engine control unit 1 calculates a target intake valve operation angle in such a manner that intake valve opening timing IVO comes before top dead center TDC as shown in FIG. 4. In order for the intake valve opening timing IVO to become advanced with respect to TDC, electrically-actuated fast-response VEL mechanism 20 is mainly operated to a larger intake valve operation angle and a larger valve lift.

At step S16, engine control unit 1 outputs VEL actuator control signal 13 responsive to the target intake valve operation angle and then drives VEL mechanism 20 to the target intake valve operation angle.

The valve overlap BO in which both of intake valves 18 and exhaust valves are open (refer to FIGS. 3A and 3B) becomes imparted with the advance of the intake valve opening timing IVO with respect to TDC, because the exhaust valve closing timing EVC is set near (or at) TDC in the first embodiment. In other words, the intake valve opening timing IVO is advanced with respect to EVC so as to secure the valve overlap BO before TDC through steps S14 and S16.

As described above, VEL mechanism 20 is operated in such a manner that the intake valve opening timing IVO becomes advanced with respect to TDC so as to secure the valve overlap BO before TDC upon detection of the malfunction in VTC mechanism 30 in the first embodiment. This allows the promotion of fuel atomization owing to the spit-back of residual gas to improve the combustion state of the fuel in the engine. The engine is thus able to attain stable fuel ignitability and combustibility, without starting failure and misfire, even in the event of a malfunction in VTC mechanism 30 and to increase in the fail-safe performance. In addition, the combustion state of fuel in the engine can be stabilized promptly upon detection of the malfunction in VTC mechanism 30 under the control of electrically-actuated quick-response VEL mechanism 20.

Figure 5:
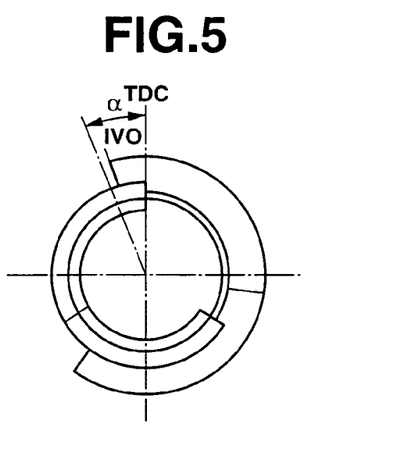
FIGS. 5 and 6 are valve timing diagrams illustrating intake and exhaust valve opening periods and valve opening/closing timing according to the second embodiment of the invention.
Figure 6:
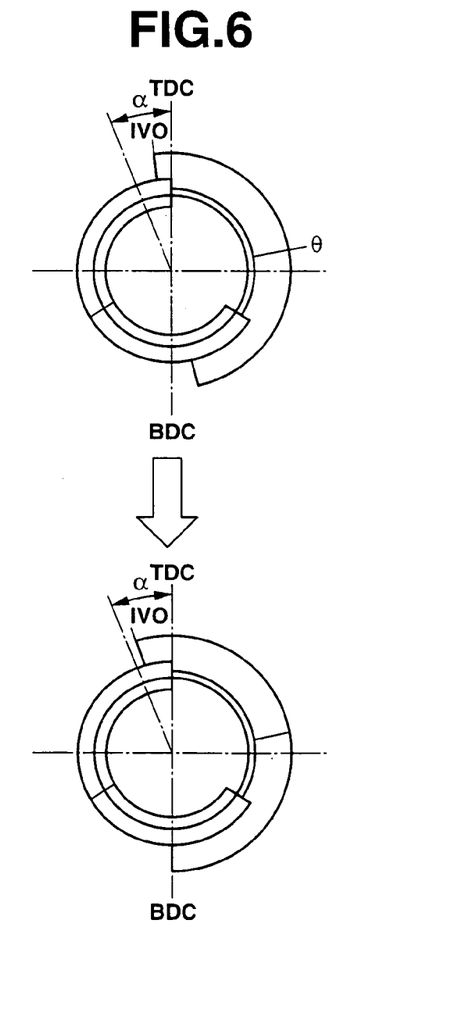
Figure 8:
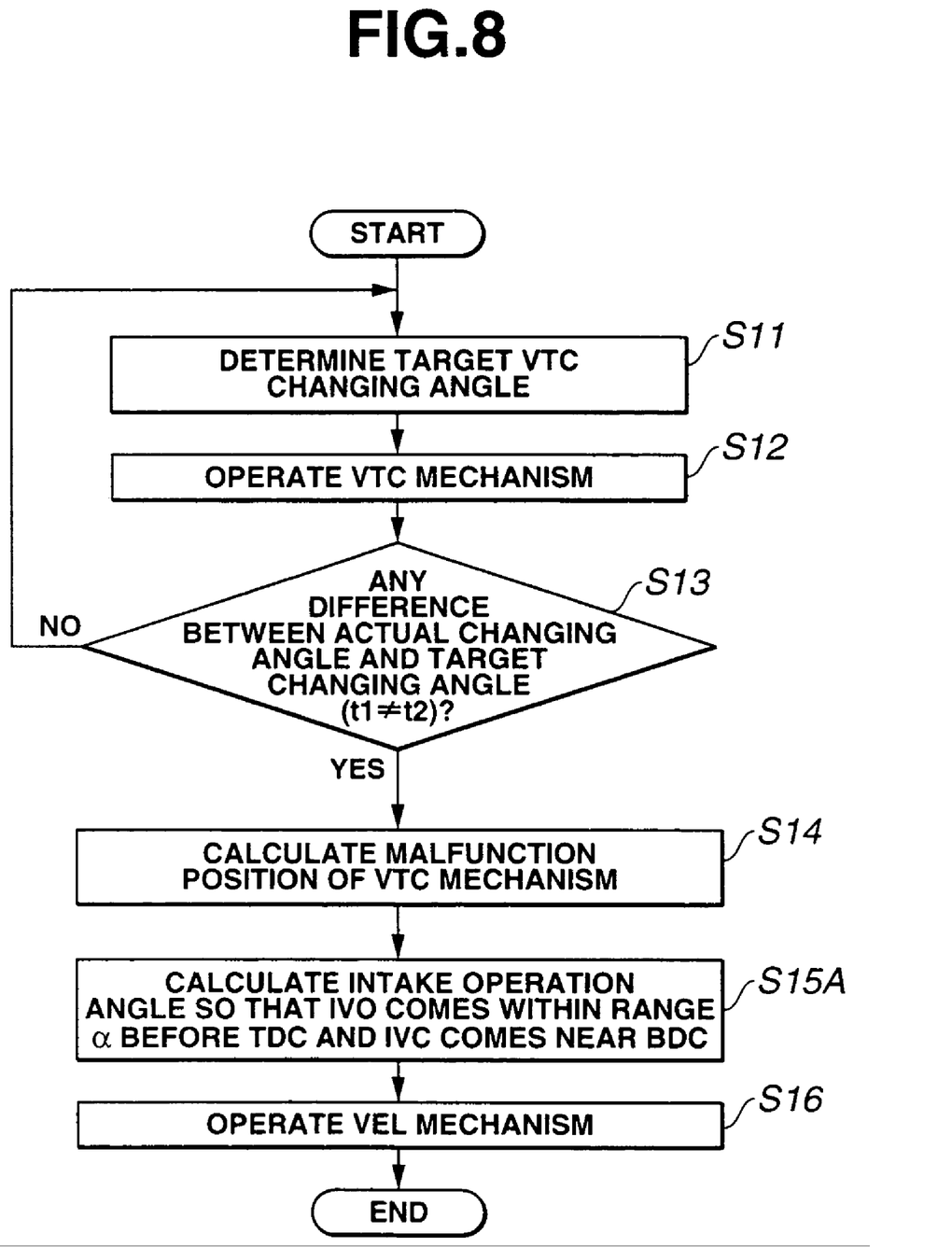
FIG. 8 is a flowchart for a valve control program run on the variable valve control system according to the second embodiment of the invention.

Next, the second embodiment will be explained below with reference to FIGS. 5, 6 and 8. The second embodiment is similar to the first embodiment, except for the fail-safe valve control operation as shown in FIG. 8.

Steps S11 to S14 are common to the first and second embodiments, so that engine control unit 1 determines a target VTC changing angle based on the engine operating conditions at step S11, drives VTC mechanism 30 to the target VTC changing angle under VTC actuator control signal 14, detects the occurrence of a malfunction in VTC mechanism 30 at step S13, and then, calculates a malfunction position of VTC mechanism 30, i.e., the maximum lift phase θ of intake valves 18 at step S14.

At step S15A, engine control unit 1 calculates a target intake valve operation angle in such a manner that intake valve opening timing IVO comes before top dead center TDC. The advance amount (BTDC) of IVO with respect to TDC is herein controlled to within a predetermined range α (e.g. 20 to 30° CA) as shown in FIG. 5. It is more desirable to calculate the target intake valve operation angle such that intake valve closing timing IVC comes nearer to (or coincides with) bottom dead center BDC as shown in FIG. 6.

At step S16, engine control unit 1 drives VEL mechanism 20 to the target intake valve operation angle under VEL actuator control signal 13.

In the second embodiment, VEL mechanism 20 is operated in such a manner that the intake valve opening timing IVO becomes advanced with respect to TDC upon detection of the malfunction in VTC mechanism 30 so as to secure the valve overlap BO before TDC, thereby promoting the atomization of fuel owing to the spit-back of residual gas to improve the combustion state of fuel in the engine, as in the case with the first embodiment. The engine is thus able to attain more stable fuel ignitability and combustibility even in the event of a malfunction in VTC mechanism 30. The valve overlap BO can be effectively prevented from becoming excessively large and causing excessive residual gas by limiting the advance amount of the intake valve opening timing IVO to within the predetermined range α. Further, the compression ratio becomes increased as the intake valve opening timing IVO nears BDC. This makes it possible to obtain a further improvement in combustion stability.

Figure 9:
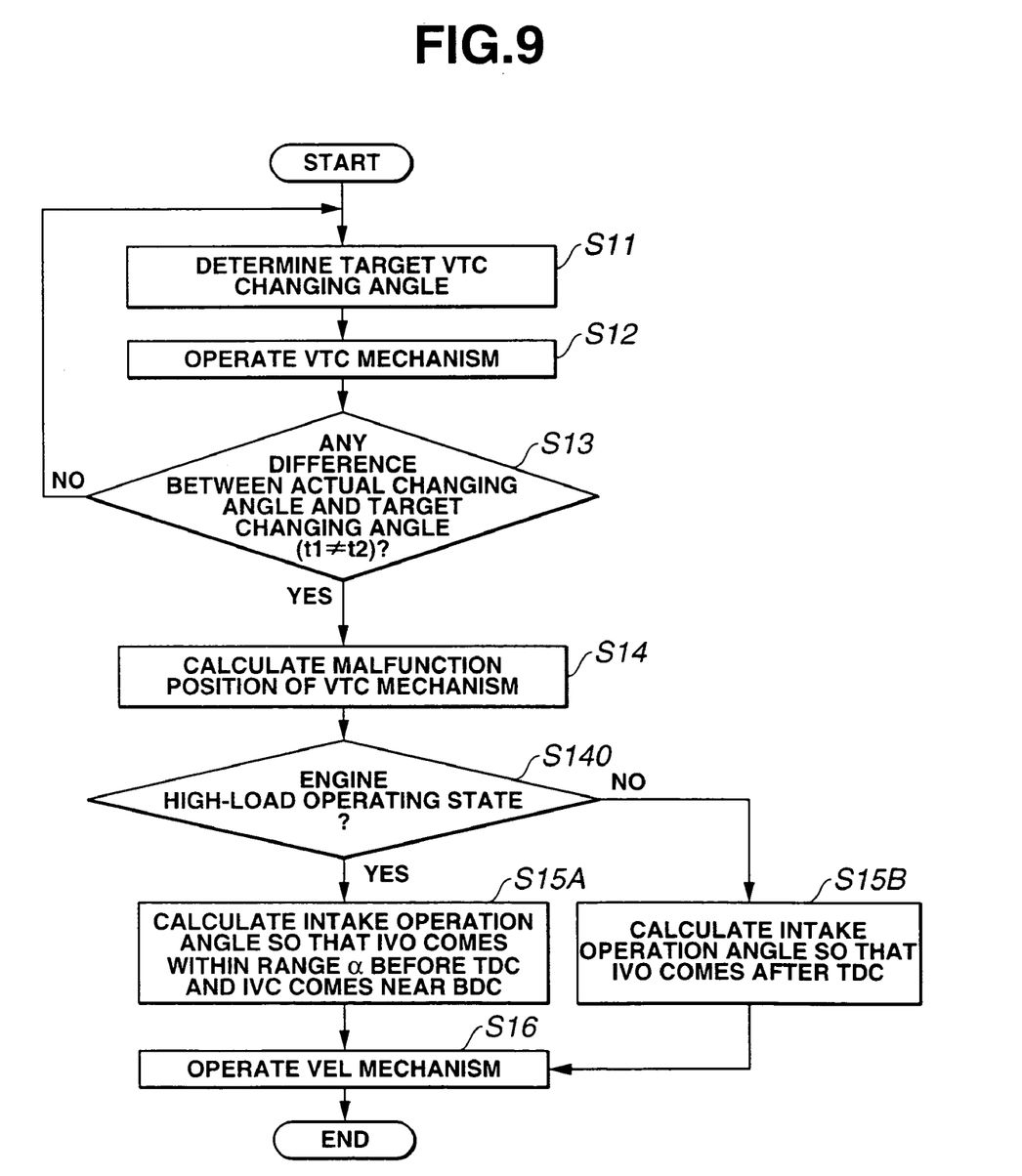
FIG. 9 is a flowchart for a valve control program run on the variable valve control system according to the third embodiment of the invention.

Finally, the third embodiment will be explained below with reference to FIG. 9. The third embodiment is similar to the first and second embodiments, except for the fail-safe valve control operation as shown in FIG. 9.

Steps S11 to S14 are common to the first, second and third embodiments, so that engine control unit 1 determines a target VTC changing angle based on the engine operating conditions at step S11, drives VTC mechanism 30 to the target VTC changing angle under VTC actuator control signal 14, detects the occurrence of a malfunction in VTC mechanism 30 at step S13, and then, calculates a malfunction position of VTC mechanism 30, i.e., the maximum lift phase θ of intake valves 18 at step S14.

At step S140, engine control unit 1 judges whether the engine is in a high-load operating state on the basis of e.g. throttle opening signal 4. If the engine is judged as being in the high-load operating state (Yes in step S140), the program proceeds to step S15A. If the engine is judged as being in a low/middle-load operating state (No in step S140), the program proceeds to step S15B.

At step S15A, engine control unit 1 calculates a target intake valve operation angle in such a manner that intake valve opening timing IVO comes before top dead center TDC. The advance amount (BTDC) of IVO with respect to TDC is also controlled to within a predetermined range α (e.g. 20 to 30° CA) in the third embodiment. Further, the target intake valve operation angle may desirably be calculated such that intake valve closing timing IVC comes nearer to (or coincides with) bottom dead center BDC as in the case with the second embodiment.

On the other hand, engine control unit 1 calculates at step S15B a target intake valve operation angle in such a manner that intake valve opening timing IVO comes after TDC.

At step S16, engine control unit 1 drives VEL mechanism 20 to the target intake valve operation angle under VEL actuator control signal 13.

In the third embodiment, VEL mechanism 20 is operated upon detection of the malfunction in VTC mechanism 30 under the high-load engine operating state so as to secure the valve overlap BO before TDC as in the case with the second embodiment. With such a fail-safe operation, the engine is able to attain improved combustion stability even in the event of a malfunction in VTC mechanism 30 under the high-load engine operating state. There is however a possibility that the fuel combustibility may be deteriorated under the low/middle-load engine operating state if the valve overlap BO becomes imparted through the same fail-safe operation as performed under the high-load engine operating state. Accordingly, VEL mechanism 20 is operated upon detection of the malfunction in VTC mechanism 30 under the low/middle-load engine operating state in such a manner that the intake valve opening timing IVO becomes retarded with respect to TDC. The engine is thus able to attain a certain level of running performance even in the event of a malfunction in VTC mechanism 30 under the low/middle-load engine operating state.

The entire contents of Japanese Patent Application No. 2004-098324 (filed on Mar. 30, 2004) are herein incorporated by reference.

Although the present invention has been described with reference to specific embodiments of the invention, the invention is not limited to the above-described embodiments. Various modification and variation of the embodiments described above will occur to those skilled in the art in light of the above teaching. For example, the range limit α of the advance amount of IVO may be adjusted according to engine speed and load. The scope of the invention is defined with reference to the following claims.

What is claimed is:

1. A variable valve control system for an internal combustion engine, comprising:
    an intake valve event and lift control mechanism capable of varying an operation angle of an intake valve of the engine;
    an intake valve timing control mechanism capable of varying a center phase of the operation angle of the intake valve;
    a detection unit to detect a malfunction in the intake valve timing control mechanism; and
    a fail-safe unit to control the intake valve event and lift control mechanism so as to advance intake valve opening timing with respect to top dead center in such a manner as to limit the amount of advance of the intake valve opening timing with respect to top dead center to within a predetermined range when the malfunction in the intake valve timing control mechanism is detected.

2. The variable valve control system of claim 1, the fail-safe unit controlling the intake valve event and lift control mechanism so as to bring intake valve closing timing nearer to bottom dead center when the malfunction in the intake valve timing control mechanism is detected.

3. The variable valve control system of claim 1, the intake valve event and lift control mechanism comprising: an intake camshaft rotated in timed relationship with a crankshaft of the engine; a swing cam mounted on the intake camshaft so as to open and close an intake valve of the engine; a drive cam eccentrically mounted on the intake camshaft; a control shaft; a control cam eccentrically mounted on the control shaft; a rocker arm pivotally mounted on the control cam and having first and second ends; a first link connecting the drive cam and the first end of the rocker arm; a second link connecting the swing cam and the second end of the rocker arm; and an actuation device to change a rotational angle of the control shaft.

4. A variable valve control system for an internal combustion engine, comprising:
an intake valve event and lift control mechanism capable of varying an operation angle of an intake valve of the engine;
an intake valve timing control mechanism capable of varying a center phase of the operation angle of the intake valve;
a detection unit to detect a malfunction in the intake valve timing control mechanism; and
a fail-safe unit to control the intake valve event and lift control mechanism, upon detection of the malfunction in the intake valve timing control mechanism, so as to advance intake valve opening timing with respect to top dead center in such a manner as to limit the amount of advance of the intake valve opening timing with respect to top dead center to within a predetermined range when the engine is in a high-load operating state and to retard the intake valve opening timing with respect to top dead center when the engine is in a low/middle-load operating state.

5. The variable valve control system of claim 4, the intake valve event and lift control mechanism comprising: an intake camshaft rotated in timed relationship with a crankshaft of the engine; a swing cam mounted on the intake camshaft so as to open and close an intake valve of the engine; a drive cam eccentrically mounted on the intake camshaft; a control shaft; a control cam eccentrically mounted on the control shaft; a rocker arm pivotally mounted on the control cam and having first and second ends; a first link connecting the drive cam and the first end of the rocker arm; a second link connecting the swing cam and the second end of the rocker arm; and an actuation device to change a rotational angle of the control shaft.

6. A variable valve control system for an internal combustion engine, comprising:
first intake valve control means for varying an intake valve operation angle of the engine;
second intake valve control means for varying a center phase of the intake valve operation angle;
malfunction detecting means for detecting a malfunction in said second intake valve control means; and
fail-safe means for controlling said first intake valve control means so as to secure a valve overlap before top dead center and limit the amount of advance of intake valve opening timing with respect to top dead center to within a predetermined range upon detection of the malfunction in said second intake valve control means.

7. The variable valve control system of claim 6, wherein the valve overlap is secured by adjusting the intake valve operation angle in such a manner that intake valve opening timing becomes advanced with respect to top dead center.

8. The variable valve control system of claim 7, wherein the amount of advance of the intake valve opening timing with respect to top dead center is limited to within a predetermined range.

9. The variable valve control system of claim 7, further comprising means for judging whether the engine is in a high-load operating state or a low/middle-load operating state, wherein said fail-safe means controls said first intake valve control means, upon detection of the malfunction in said second intake valve control means, in such a manner that the intake valve opening timing becomes advanced with respect to top dead center so as to secure the valve overlap before top dead center when the engine is in the high-load operating state and in such a manner that intake valve opening timing becomes retarded with respect to top dead center when the engine is in the low/middle-load operating state.

10. The variable valve control system of claim 6, wherein the first intake valve control means is electrically actuated.

11. The variable valve control system of claim 6, wherein exhaust valve closing timing is set at or near top dead center.

12. A variable valve control method for an internal combustion engine, comprising:
detecting a malfunction in intake valve timing control of the engine; and
performing a fail-safe control operation to secure a valve overlap before top dead center and limit an amount of advance of the intake valve opening timing with respect to top dead center to within a predetermined range upon detection of the malfunction in intake valve timing control of the engine.

* * * * *